United States Patent
Cooksey

(10) Patent No.: US 10,142,458 B1
(45) Date of Patent: Nov. 27, 2018

(54) DEVICE FOR JAMMING A CELLULAR PHONE WITHIN A VEHICLE

(71) Applicant: Calvin Cooksey, Bradenton, FL (US)

(72) Inventor: Calvin Cooksey, Bradenton, FL (US)

( * ) Notice: Subject to any disclaimer, the term of this patent is extended or adjusted under 35 U.S.C. 154(b) by 0 days.

(21) Appl. No.: 15/652,387

(22) Filed: Jul. 18, 2017

(51) Int. Cl.
*H04M 1/725* (2006.01)
*H04B 1/3822* (2015.01)
*H04B 1/3827* (2015.01)

(52) U.S. Cl.
CPC ...... *H04M 1/72577* (2013.01); *H04B 1/3822* (2013.01); *H04B 1/3833* (2013.01)

(58) Field of Classification Search
CPC ............. H04M 1/72577; H04B 1/3822; H04B 1/3833
See application file for complete search history.

(56) References Cited

U.S. PATENT DOCUMENTS

| | | | |
|---|---|---|---|
| D441,524 S | 5/2001 | Shimizu | |
| 8,295,854 B2 | 10/2012 | Osann, Jr. | |
| 8,751,065 B1* | 6/2014 | Kato | H04M 1/72533 340/426.13 |
| 8,994,492 B2 | 3/2015 | Farhan | |
| 9,167,418 B1 | 10/2015 | Tuluca | |
| 2002/0197911 A1* | 12/2002 | Holmes | H04M 1/6091 439/638 |
| 2009/0224931 A1 | 9/2009 | Dietz | |
| 2011/0065375 A1* | 3/2011 | Bradley | H04M 1/72577 455/1 |
| 2011/0183601 A1* | 7/2011 | Hannon | B60K 35/00 455/1 |
| 2011/0195699 A1* | 8/2011 | Tadayon | H04B 5/0062 455/418 |
| 2011/0304446 A1 | 12/2011 | Basson | |
| 2012/0007983 A1* | 1/2012 | Welch | G07B 15/063 348/148 |
| 2014/0043135 A1 | 2/2014 | Kotecha | |
| 2016/0050309 A1 | 2/2016 | Gooberman | |
| 2016/0174051 A1* | 6/2016 | Yae | H04W 4/16 455/414.1 |

* cited by examiner

*Primary Examiner* — Charles Appiah
*Assistant Examiner* — Edward Zhang

(57) ABSTRACT

The device for jamming a cellular phone within a vehicle is configured for use with one or more personal data devices. The device for jamming a cellular phone within a vehicle partially inhibits the operation of a personal data device selected from the one or more personal data devices. By inhibiting the operation of the selected personal device is meant that the selected personal data device is only capable of hands free operation. The device for jamming a cellular phone within a vehicle comprises a safety device, an automobile, an application for the personal data device, and a blocked device.

9 Claims, 2 Drawing Sheets

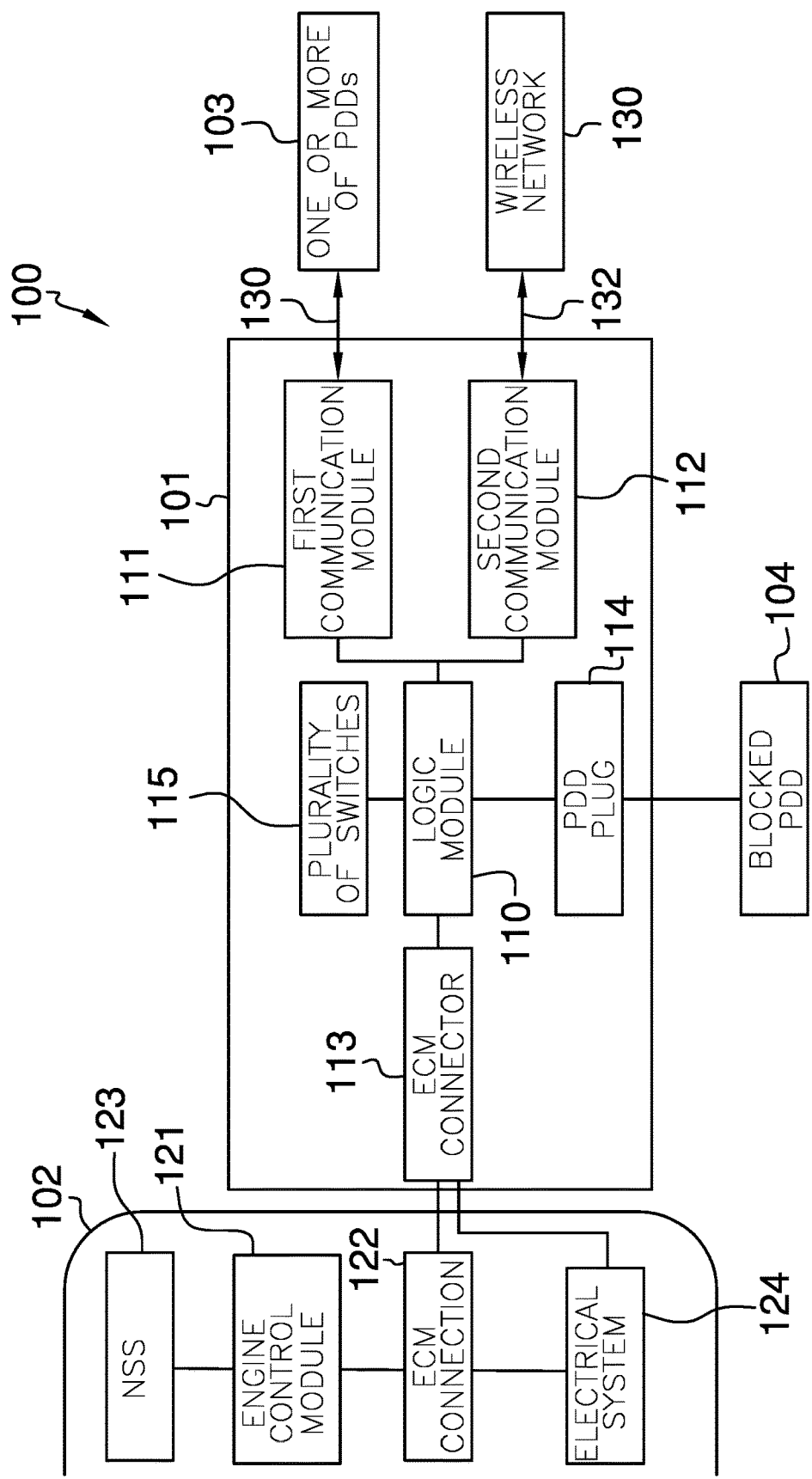

DEVICE FOR JAMMING A CELLULAR PHONE WITHIN A VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of wireless communication and networks, more specifically, a local resource management device.

SUMMARY OF INVENTION

The device for jamming a cellular phone within a vehicle is a safety device that is configured for use with a vehicle. The device for jamming a cellular phone within a vehicle is configured for use with one or more personal data devices. The device for jamming a cellular phone within a vehicle inhibits the operation of a personal data device selected from the one or more personal data devices. By inhibiting the operation of the selected personal device is meant that the selected personal data device is only capable of hands free operation. The device for jamming a cellular phone within a vehicle comprises a safety device, an automobile, an application on the personal data device, and a blocked device.

These together with additional objects, features and advantages of the device for jamming a cellular phone within a vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the device for jamming a cellular phone within a vehicle in detail, it is to be understood that the device for jamming a cellular phone within a vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the device for jamming a cellular phone within a vehicle.

It is therefore important that the claims be regarded as including such equivalent construction insofar as they do not depart from the spirit and scope of the device for jamming a cellular phone within a vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a block diagram of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
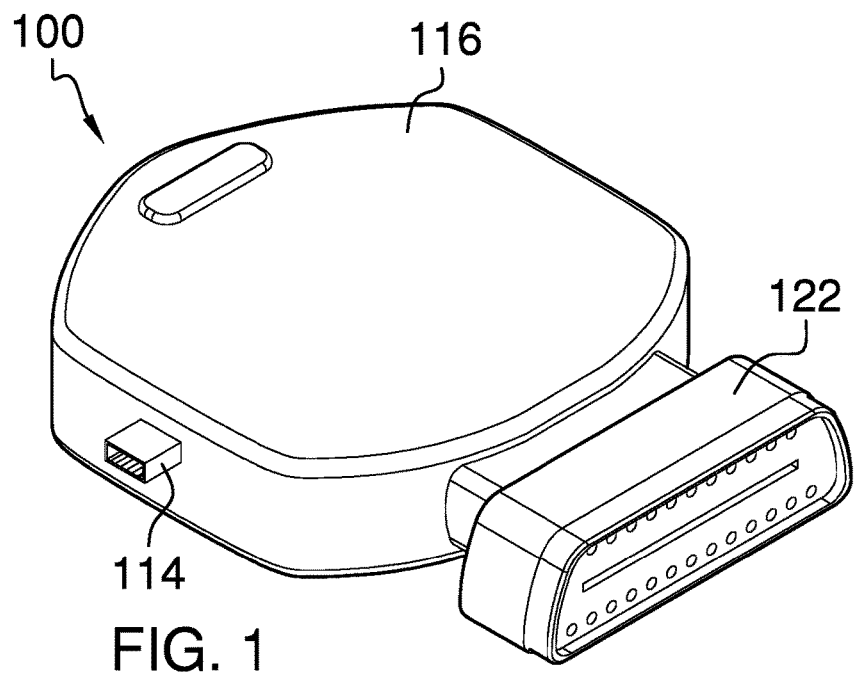
FIG. 1 is a perspective view of an embodiment of the disclosure.
Figure 2:
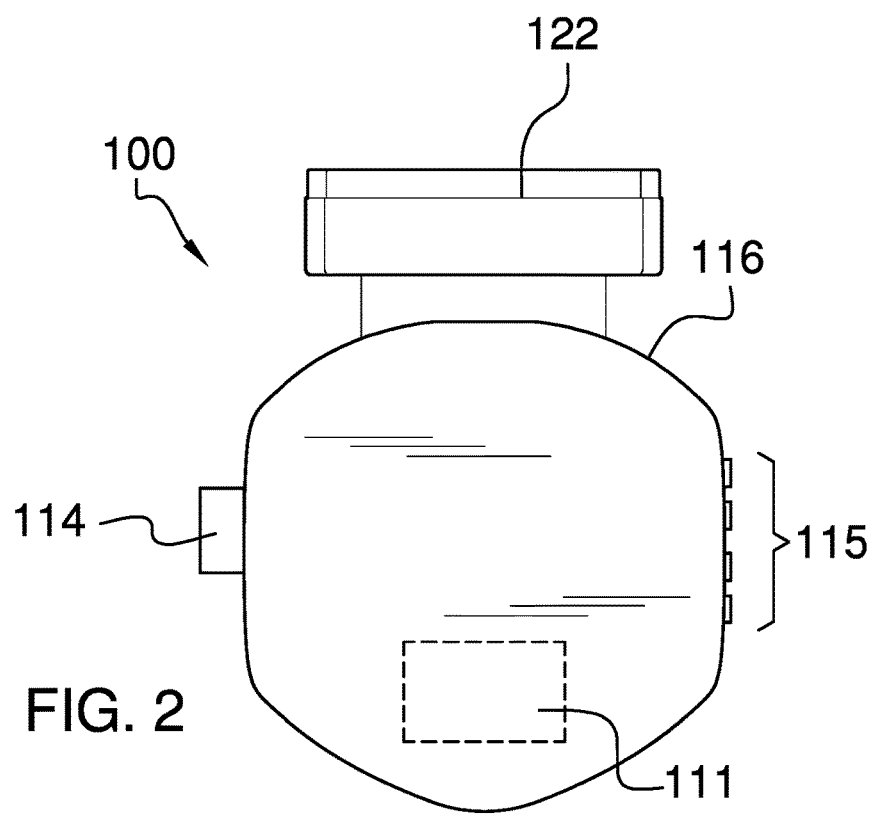
FIG. 2 is a bottom view of an embodiment of the disclosure.

Detailed reference will now be made to one or more potential embodiments of the disclosure, which are illustrated in FIGS. 1 through 3.

The device for jamming a cellular phone within a vehicle 100 (hereinafter invention) is a safety device 101 that is configured for use with a vehicle 102. The invention 100 is configured for use with one or more personal data devices 103. The invention 100 inhibits the operation of a personal data device selected from the one or more personal data devices 103. By inhibiting the operation of the selected personal device is meant that the selected personal data device is only capable of hands free operation, much less not functional at all. The invention 100 comprises a safety device 101, an automobile 102, and a blocked device 104. The safety device 101 is installed in the vehicle 102. The blocked device 104 is the selected personal data device.

Each of the one or more personal data devices 103 is a readily and commercially available handheld electronic device. The blocked device 104 is a personal data device that is selected from the one or more personal data devices 103. The blocked device 104 connects to the safety device 101 in such a manner that the safety device 101 is able to request of the blocked device 104 that the blocked device 104 limit its operation to hands free operation when the transmission of the vehicle 102 is not in a parked setting. Within this disclosure, it is assumed that the blocked device 104 is a personal data device of the operator of the vehicle 102. The hands free operation of the blocked device 104 is discussed in greater detail elsewhere in this disclosure.

The vehicle 102 is a motorized device that transports people and cargo over a road network. In the first potential embodiment of the disclosure, it is assumed that the vehicle 102 is an automobile. The vehicle 102 is further defined with an engine control module 121, an ECM connection 122, a neutral safety switch 123, a vehicle electrical system 124 and a transmission.

The engine control module 121 is a programmable electronic device that has the primary function of optimizing the operation of the engine of a vehicle 102. Secondary functions of the engine control module 121 include: 1) monitoring the operating status of the vehicle 102; and, 2) interfacing with external electronic devices to share information about the vehicle 102 and to receive instructions regarding the operation of the vehicle 102. The engine control module 121 is often referred to as an ECM or an ECU. The disclosure will use the term engine control module 121 to refer to the primary engine control module 121 and will use the term ECM to refer to peripheral devices and functions of the engine control module 121.

The ECM connection 122 refers to a standardized physical connection port into which an ECM connector 113 is inserted to electrically connect the engine control module 121 to the safety device 101. This connection is assumed to be a permanent connection. The ECM connection 122 is compliant with the SAE and is compatible with the ECM connector 113. The ECM connector 113 and the SAE is discussed in more detail elsewhere in this disclosure.

The neutral safety switch 123 is a sensor that determines the setting of the transmission of the vehicle 102. This setting is monitored by the engine control module 121 and the status of the neutral safety switch 123 can be accessed by the logic module 110 using the SAE.

When the neutral safety switch 123 is not in a "parked" state, the logic module 110 requests the limitation of the operation of the blocked device 104 to hands free operation and enables the operation of the first communication device 111 and the second communication device 112 under the assumption that the vehicle 102 is in operation. When the neutral safety switch 123 is in a parked state, the logic module 110 permits the full functionality of blocked device 104 and disables the operation of the first communication device 111 and the second communication device 112 under the assumption that the vehicle 102 is not in operation.

The vehicle electrical system 124 refers to the electrical system of the vehicle 102. As shown most clearly in FIG. 3, the SAE accommodates the ability of an external electronic device to draw power from the vehicle electrical system 124 through the ECM connection 122.

The safety device 101 is an electrical device that is installed within the vehicle 102. The safety device 101: 1) requests the identification of the blocked device 104; 2) requests the limitation of the operation of the blocked device 104 while the vehicle 102 is in operation; and, 3) creates a first wireless communication link 131 with the personal data devices contained within the one or more personal data devices 103 (with the exception of the blocked device 104); and, 4) relies on an application provided on the personal data device to disable the blocked device 104.

By limiting the operation of the blocked device 104 is meant that 1) handsfree voice operation of the blocked device 104 remains enabled; while, 2) all remaining visual and text based functions of the blocked device 104 are disabled while the vehicle 102 is in operation. The limitation of the blocked device 104 is requested by the logic module 110 and is initiated and enforced by the blocked device 104.

The safety device 101 comprises a logic module 110, a first communication device 111, a second communication device 112, an ECM connector 113, a PDD plug 114, and a housing 116.

The logic module 110 is a readily and commercially available programmable electronic device that is used to manage, regulate, and operate the invention 100. The logic module 110 will not inhibit the engine control module 121 from starting the vehicle 102 if a blocked device 104 is not identified to the invention 100.

The first communication device 111 is a readily and commercially available wireless electronic communication device that creates a first wireless communication link 131 between the safety device 101 and each of the one or more personal data devices 103 other than the blocked device 104. In the first potential embodiment of the disclosure, the first communication device 111 created the first wireless communication link 131 using a connection protocol selected from the group consisting of a Bluetooth protocol or an 802.3 based protocol.

The second communication device 112 is a readily and commercially available wireless electronic communication device that creates a second wireless communication link 132 between the safety device 101 and a publicly available commercial wireless network 130. The second communication device 112 creates the second wireless communication link 132 using commercially available hardware.

The intention of the first communication device 111 and the second communication device 112 is to create what is commonly referred to as a "hot spot." Each of the one or more personal data devices 103 is able to establish a connection to the internet using the first wireless communication link 131 created by the first communication device 111 and the second wireless communication link 132 created by the second communication device 112 while the vehicle 102 is in operation. Optionally, the blocked device 104 may access the internet through voice commands.

The ECM connector 113 is an electrical device that connects the logic module 110 to the engine control module 121. Methods and protocols to interface an electronic device into the engine control module 121 of a vehicle are well known in the electrical arts. A plurality of these interface methods and protocols are documented and published by the Society of Automotive Engineers. Within this disclosure, these standardized methods and protocols will be referred to as the SAE.

The PDD plug 114 is a plug that is inserted into a port of the blocked device 104. The PDD plug 114 provides the logic module 110 with access to the blocked device 104 such that the logic module 110 can inhibit the operation of the blocked device 104. Methods to interface with and operate a personal data device using a logic module 110 are well known and documented in the electrical arts. The PDD plug 114 forms a physical electrical connection between the logic module 110 and the blocked device 104. This physical connection ensures that the safety device 101 is connected to an actual electronic device and not a wireless simulation of a personal data device.

The housing 116 is a casing within which the balance of the safety device 101 is contained. The housing 116 is formed with all necessary apertures and form factors necessary to allow the housing 116 to accommodate the use and operation of the invention 100.

In a second potential embodiment of the disclosure, the safety device further comprises a plurality of override switches 115. The plurality of override switches 115 forms an apparatus that allows for permanently overriding the inhibition of the blocked device 104. Each of the plurality of override switches 115 is a maintained switch. The position of each of the plurality of override switches 115 is monitored via the logic module 110. In the event that the vehicle 102 must be operated without a blocked device 104, the position of each of the plurality of override switches 115 may be manually positioned in a predetermined manner.

Within this disclosure, the publicly available commercial wireless network 130 refers to a commercially provided and publicly available wireless data network that provides personal data devices access to the internet. The first wireless communication link 131 refers to a wireless communication link that is established between the first communication device 111 and any and all of the one or more personal data devices 103. The second wireless communication link 132 refers to a wireless communication link that is established between the safety device 101 and the publicly available commercial wireless network 130.

The following definitions were used in this disclosure:

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Bluetooth: As used in this disclosure, Bluetooth is a standardized communication protocol that is used to wirelessly interconnect electronic devices.

Form Factor: As used in this disclosure, the term form factor refers to the size and shape of an object.

Handheld: As used in this disclosure, when referring to an item or device, handheld means that the item or device is small and light enough to be operated while a person holds the item or device in their hands.

Housing: As used in this disclosure, a housing is a rigid casing that encloses and protects one or more devices.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Maintained Switch: A used in this disclosure, a maintained switch is a switch that maintains the position that was set in the most recent switch actuation. A maintained switch works in an opposite manner to a momentary switch.

Park: As used in this disclosure, park refers to: 1) a space or area dedicated for a specific purpose such as a recreational park, an industrial park, a ball park, or a parking lot; or, 2) to a prepare an object for and the place in a stationary location particularly when the object is a vehicle.

PDD: As used in this disclosure, PDD is an acronym for personal data device.

Personal Data Device: As used in this disclosure, a personal data device is a handheld device that is used for managing personal information and communication. Examples of personal data device include, but are not limited to, cellular phones, tablets and smart phones.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Vehicle: As used in this disclosure, a vehicle is a motorized device that is used transporting carrying passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicle safety apparatus comprising:
   wherein the vehicle safety apparatus comprises a safety device, an automobile, and a blocked device;
   wherein the safety device is installed in the vehicle;
   wherein the vehicle safety apparatus is configured for use with a vehicle;
   wherein the vehicle safety apparatus is configured for use with one or more personal data devices;
   wherein the vehicle safety apparatus limits the operation of the blocked device;
   wherein each of the one or more personal data devices is a handheld electronic device;
   wherein the blocked device is a personal data device that is selected from the one or more personal data devices;
   wherein the blocked device connects to the safety device in such a manner that the safety device is able to limit the operation of the blocked device;
   wherein the vehicle is a motorized device that transports people and cargo over a road network;
   wherein the vehicle is further defined with an engine control module, an ECM connection, a neutral safety switch, a vehicle electrical system and a transmission;
   wherein the engine control module is a programable electronic device that optimizes the operation of the engine of a vehicle;
   wherein the engine control module monitors the operating status of the vehicle;
   wherein the engine control module interfaces with external electronic devices to share information about the vehicle and to receive instructions regarding the operation of the vehicle;
   wherein the ECM connection is a physical port that forms an electrical connection between the engine control module and the safety device;
   wherein the neutral safety switch is a sensor that determines the setting of the transmission of the vehicle;
   wherein the neutral safety switch is monitored by the engine control module;
   wherein the status of the neutral safety switch is shared with the safety device;
   wherein the safety device draws electrical power from the vehicle electrical system;
   wherein the safety device is an electrical device that is installed within the vehicle;
   wherein by limiting the operation of the blocked device is further meant that all remaining visual and text based functions of the blocked device are disabled while the vehicle is in operation;

wherein the safety device creates a first wireless communication link with the personal data devices contained within the one or more personal data devices with the exception of the blocked device;

wherein the safety device establishes a second wireless communication link with a publicly available commercial wireless network;

wherein the safety device comprises a logic module, a first communication device, a second communication device, an ECM connector, a PDD plug, and a housing;

wherein the logic module, the first communication device, the second communication device, the ECM connector, and the PDD plug are electrically interconnected;

wherein the logic module, the first communication device, the second communication device, the ECM connector, and the PDD plug are contained within the housing.

2. The vehicle safety apparatus according to claim 1
wherein the safety device limits the operation of the blocked device while the vehicle is in operation;
wherein by limiting the operation of the blocked device is meant that handsfree voice operation of the blocked device remains enabled while the vehicle is in operation.

3. The vehicle safety apparatus according to claim 1 wherein the ECM connector is inserted into ECM connection to electrically connect the engine control module to the logic module.

4. The vehicle safety apparatus according to claim 3
wherein when the neutral safety switch is not in a parked state, the logic module limits the operation of the blocked device and enables the operation of the first communication device and the second communication device under the assumption that the vehicle is in operation;
wherein when the neutral safety switch is in a parked state, the logic module permits the full functionality of blocked device and disables the operation of the first communication device and the second communication device under the assumption that the vehicle is not in operation.

5. The vehicle safety apparatus according to claim 4
wherein the logic module is a programmable electronic device;
wherein the first communication device is a first wireless electronic communication device that creates a first wireless communication link between the safety device and each of the one or more personal data devices other than the blocked device;
wherein the second communication device is a second wireless electronic communication device that creates a second wireless communication link between the safety device and a publicly available commercial wireless network;
wherein the intention of the first communication device and the second communication device create a hot spot.

6. The vehicle safety apparatus according to claim 5 wherein each of the one or more personal data devices, with the exception of the blocked device, is able to establish a connection to the internet using the first wireless communication link created by the first communication device and the second wireless communication link created by the second communication device.

7. The vehicle safety apparatus according to claim 6
wherein the PDD plug is a plug that is inserted into a port of the blocked device;
wherein the PDD plug provides the logic module with access to the blocked device such that the logic module can inhibit the operation of the blocked device;
wherein the PDD plug forms a physical electrical connection between the logic module and the blocked device.

8. The vehicle safety apparatus according to claim 7
wherein the safety device further comprises a plurality of override switches;
wherein each of the plurality of override switches are electrically connected to the logic module.

9. The vehicle safety apparatus according to claim 8
wherein each of the plurality of override switches is a maintained switch;
wherein the position of each of the plurality of override switches is monitored by the logic module;
wherein the position of each of the plurality of override switches may be manually positioned in a predetermined manner;
wherein should the logic module find the plurality of override switches are set in this predetermined manner, the logic module will allow the engine control module to start the vehicle without the attachment of the blocked device to the PDD plug.

* * * * *